May 17, 1949.　　　C. O. LARSON　　　2,470,706
SAFETY HOOK
Filed June 11, 1945
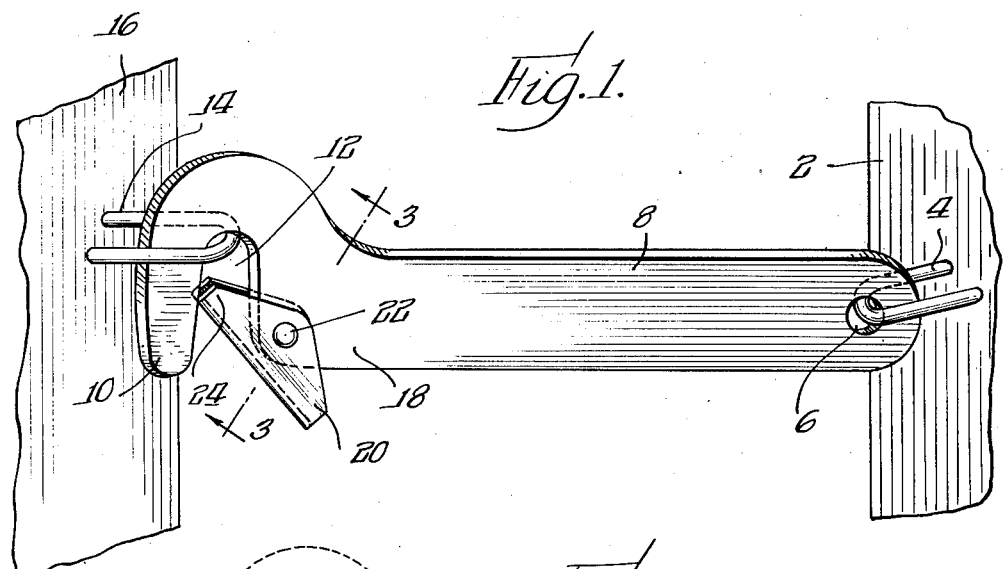
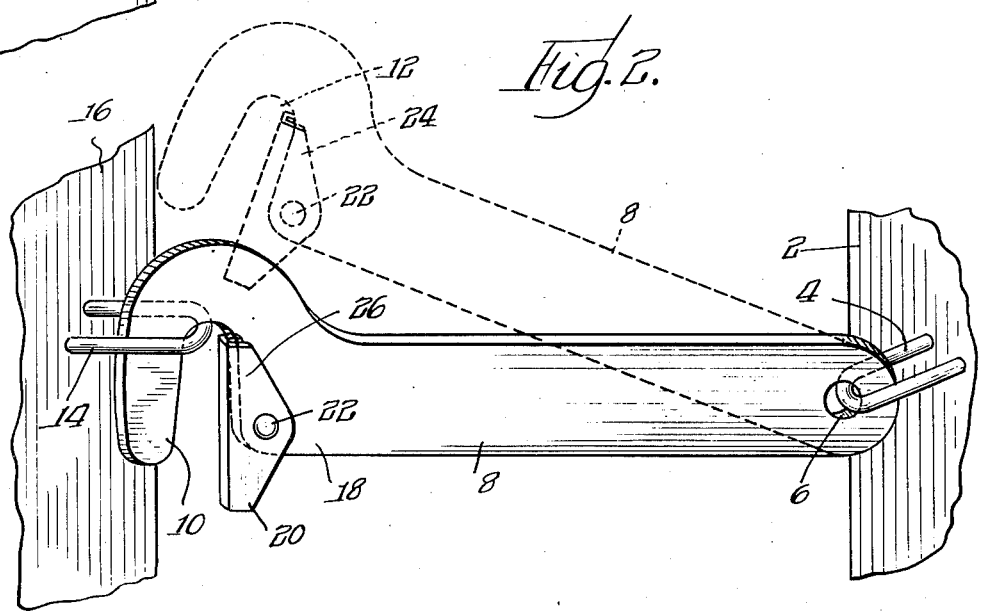
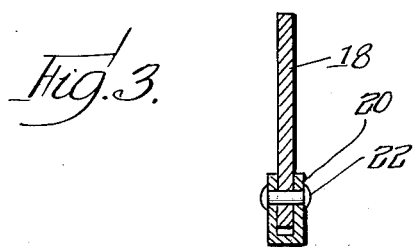
INVENTOR.
Charles O. Larson
BY
Moore, Olson & Trexler
attys.

Patented May 17, 1949

2,470,706

UNITED STATES PATENT OFFICE 2,470,706

SAFETY HOOK

Charles O. Larson, Sterling, Ill.

Application June 11, 1945, Serial No. 598,833

2 Claims. (Cl. 292—108)

This invention relates to a livestock safety hook having various applications but generally used as a gate hook for restraining livestock.

It is an object of the present invention to provide a simple type of livestock safety hook which is constructed so that the safety latch will automatically snap under the staple when the hook is inserted in the staple and which will not release upon the application of upward pressure to the hook.

Other and further objects of the invention will be apparent from a perusal of the following specification when taken in connection with the accompanying drawing, wherein:

Figure 1 is a side view of the gate hook, showing the hook inserted in the staple and the latch automatically in such position as to lock the hook over the staple;

Figure 2 is a similar view showing various positions of the hook when the latch is moved by hand to releasing position; and Figure 3 is a sectional detail on the line 3—3 of Figure 1.

Heretofore farmers have had trouble in keeping stock fenced in due to the fact that the stock soon learn to push up the gate hooks and unfasten the gates that are held by the hooks. The present type of safety hook which is herein illustrated, for the purposes of exemplification but not by way of limitation, as a safety hook for livestock, is formed of a single piece of relatively thin metal having a hook shaped portion at one end and a pivotal connection for a staple at the other end. The hook is adapted to be inserted in a staple formed on that portion of the fence opening opposite to which the gate swings to closed position so that the hook may be inserted through the staple. In addition, the hook is provided with a simple type of pivoted latch which is constructed and arranged so that gravity locks the trigger and upward pressure on the trigger or latch will not release the mechanism nor will upward pressure on the hook release the trigger. To unlock the safety hook it is desirable to push the hook rearwardly away from the staple through which it is inserted and release the trigger by hand and then lift the hook upwardly. In other words, as constructed, this safety latch or trigger will automatically snap by gravity under the staple, and any upward pressure will not release the hook.

Referring now to the drawings in detail, the front edge of the gate 2 is provided with any type of staple 4 which passes through an eye 6 of a hook having an elongated body-like portion 8 formed of relatively thin metal. This body-like portion 8 is provided with the relatively long hook 10 and the adjacent opening 12. The hook proper is adapted to pass through a staple 14 fastened to a stationary post 16 adjacent the opening to be closed. At the throat portion 18 of the hook, adjacent the opening 12, a latch or trigger 20 is pivoted as at 22. The latch is overbalanced so that it tends normally to assume the latched position as shown in Figure 1, the weight being such that the end 20 of the latch moves upwardly and the opposite end 24 downwardly to close the opening 12. The latch is formed of a single piece of metal bent to channel or U shape, with substantially triangular side walls and a base portion disposed along the bottom of the body portion 8 of the bar and substantially tangentially to the corner of the bar at the bottom of the wall 26 at the one side of the throat opening. The latch is as shown in Figure 3, arranged so that, in Figure 2, when it is swung manually to open position the channel will pass on opposite sides of the straight wall portion 26 of the opening 12 so as to permit sufficient width of the opening 12 to permit the hook 10 to pass upwardly freely to release the hook from the staple. It will be seen that where the end 20 is made the heavier end of the latch, this end, when released and by reason of the offset position of the pivot 22, will swing the latch from the position of Figure 2 to the latched position of Figure 1. It will be noted that when upward pressure is exerted on the bottom portion of the latch 20 it will not operate to swing the latch clockwise to open the throat 12. To release the latch one pushes to the right, as shown in Figure 2, upon the hook 8 and thence the lower end of the latch 20 is moved to the left to shift the nose 24 of the latch in a clockwise direction to the position shown in Figure 2, whence the hook 8 may be lifted vertically from its staple 14.

Obviously the invention is not limited to the specific details of construction disclosed herein but is capable of other modifications and changes without departing from the spirit and scope of the appended claims.

Having thus described my invention, what is claimed as new and desired to be secured by Letters Patent is:

1. A livestock safety hook comprising an elongated, relatively flat bar having at one end provision for pivotal connection to a member to be locked, the opposite end of the bar being goosenecked in formation to provide a relatively long hook extending transversely of the longitudinal axis of the bar and an intervening long throat extending substantially parallel with the hook, and an elongated latch pivotally mounted to the bottom portion of the bar adjacent the bottom of the throat and adapted under the influence of gravity to assume an inclined position at an angle of substantially forty-five degrees to the longitudinal axis of the bar and with the lower end of the latch extending below the bar and lying laterally of the pivotal axis in a direction away from the throat whereby to prevent release of the latch upon the application of upward pressure to the lower end thereof.

2. A gate hook comprising an elongated body portion having a part adapted to pivot at one end to a member to be closed and terminating in a gooseneck-shaped hook, there being an open-ended throat between the hook and the body portion, and a channel-shaped latch comprising a piece of metal doubled upon itself to provide a bottom portion lying in a single plane and two side walls each with converging diagonal edges, the cross section of the latch being channel-shaped, said latch being pivoted substantially at the convergence of the diagonal edges and with the channel-shaped metal straddling the bottom of the body portion at the end thereof adjacent the opening of the throat and arranged so that said bottom portion of the latch normally assumes a tilted position due to gravity with the upper arm thereof normally approaching the hook so as to close the throat opening and with the lower arm thereof depending below said body portion and said pivotal point being located such that a direct thrust upwardly upon the diagonally depending arm of the latch will cause the said upper arm to bear against the hook.

CHARLES O. LARSON.

REFERENCES CITED

The following references are of record in the file of this patent:

UNITED STATES PATENTS

| Number | Name | Date |
|--------|------|------|
| 842,970 | Parsons | Feb. 5, 1907 |
| 992,565 | Kehlet | May 16, 1911 |